(12) United States Patent  
Murata (10) Patent No.: US 8,786,902 B2
(45) Date of Patent: Jul. 22, 2014

(54) IMAGE PROCESSING APPARATUS, METHOD AND PRINTER FOR GENERATING THREE-DIMENSIONAL PAINTERLY IMAGE

(75) Inventor: Yoshiyuki Murata, Saitama (JP)

(73) Assignee: Casio Computer Co., Ltd., Tokyo (JP)

( * ) Notice: Subject to any disclaimer, the term of this patent is extended or adjusted under 35 U.S.C. 154(b) by 56 days.

(21) Appl. No.: 13/549,749

(22) Filed: Jul. 16, 2012

(65) Prior Publication Data

US 2013/0021627 A1 Jan. 24, 2013

(30) Foreign Application Priority Data

Jul. 19, 2011 (JP) ................. 2011-157597

(51) Int. Cl.
*H04N 1/60* (2006.01)
(52) U.S. Cl.
USPC .......... 358/1.9; 358/1.15; 358/1.18; 358/518; 382/167; 345/581; 345/582
(58) Field of Classification Search
None
See application file for complete search history.

(56) References Cited

U.S. PATENT DOCUMENTS

| | | | | |
|---|---|---|---|---|
| 6,219,459 | B1 * | 4/2001 | Kurashige | 382/266 |
| 7,205,995 | B1 * | 4/2007 | Hod et al. | 345/581 |
| 8,547,386 | B2 * | 10/2013 | Odagiri | 345/582 |
| 2005/0281480 | A1 * | 12/2005 | Baldwin | 382/276 |
| 2006/0072175 | A1 * | 4/2006 | Oshino | 358/537 |
| 2011/0064299 | A1 * | 3/2011 | Zhang et al. | 382/154 |
| 2011/0292062 | A1 * | 12/2011 | Hirotani | 345/581 |
| 2012/0163733 | A1 * | 6/2012 | Yoon et al. | 382/286 |
| 2012/0249584 | A1 * | 10/2012 | Naruse | 345/629 |

FOREIGN PATENT DOCUMENTS

| | | |
|---|---|---|
| JP | 2001-150812 A | 6/2001 |
| JP | 2004-077927 A | 3/2004 |
| JP | 2004-213598 A | 7/2004 |
| JP | 2008-244831 A | 10/2008 |
| JP | 2008244831 A * | 10/2008 |
| JP | 2010-154422 A | 7/2010 |
| JP | 2011-138240 A | 7/2011 |

OTHER PUBLICATIONS

Japanese Office Action dated May 7, 2013 (and English translation thereof) in counterpart Japanese Application No. 2011-157597.

* cited by examiner

*Primary Examiner* — Dung Tran
(74) *Attorney, Agent, or Firm* — Holtz Holtz Goodman & Chick PC (57) ABSTRACT

An image processing apparatus includes an image acquiring unit, a distance acquiring unit, a painterly transformation processor, a thickness information acquiring unit, and a data generating unit. The distance acquiring unit acquires distance information for each of at least one object image included in an acquired image. The painterly transformation processor transforms each of the object image, included in the acquired image, into a painterly image. The thickness information acquiring unit acquires thickness information corresponding to the distance for each of the object image. The data generating unit generates data in which the painterly image and the thickness information are associated with each other.

11 Claims, 9 Drawing Sheets

| | | SECOND MEMORY | | THIRD MEMORY | | FOURTH MEMORY |
|---|---|---|---|---|---|---|
| FIRST MEMORY | | OBJECT IMAGE | COORDINATES | OBJECT DISTANCE | OBJECT THICKNESS | PAINTERLY IMAGE |
| ENTIRE IMAGE | | MOUNTAIN A | (x1, y1) ...... | a [m] (FIRST) | a [mm] | |
| | | MOUNTAIN B | (x2, y2) ...... | b [m] (SECOND) | b [mm] | |
| | | MOUNTAIN C | (x3, y3) ...... | c [m] (THIRD) | c [mm] | |
| | | . . . . | . . . . | . . . . | . . . . | |

IMAGE PROCESSING APPARATUS, METHOD AND PRINTER FOR GENERATING THREE-DIMENSIONAL PAINTERLY IMAGE

BACKGROUND OF THE INVENTION

1. Field of the Invention

The present invention relates to an image processing apparatus, a printer, and an image processing method to transform a captured image into a painterly image.

2. Description of Related Art

A conventional digital camera selects a desired point for ranging from a plurality of points to focus on a target object, and thus captures an image that focuses on the target object.

A transformation technology is proposed to generate a painterly image that imitates characteristics of a painting drawn by a painter in a simulated manner (refer to Japanese Unexamined Patent Application Publication No. 2004-213598 below, for example). Thus, the transformation technology can transform an image captured by the digital camera into a painterly image.

The transformation technology, however, imitates characteristics of a painting drawn by a specific painter in a simulated manner for an entire image. Thus, even if a plurality of objects exists in an image at different distances from a person who captures the image, the same characteristics are applied to all the objects in image transformation. Therefore, when a plurality of objects exist at different shooting distances in an image, it is not possible to change the way of image transformation depending on the shooting distance of an object. Furthermore, a three-dimensional painterly image cannot be obtained.

SUMMARY OF THE INVENTION

In view of such circumstances, an object of the present invention is to provide an image processing apparatus, a printer, and an image processing method that quickly and easily provide a three-dimensional painterly image faithfully representing a three-dimensional object viewed from a person who captures an image.

In order to solve the above-mentioned problems, according to a first aspect of the present invention, there is provided an image processing apparatus including: an image acquiring unit that acquires an image; a distance acquiring unit that acquires distance information based on a distance to an object for each of at least one object image included in the image acquired by the image acquiring unit; a painterly transformation processor that transforms each of the at least one object image into a painterly image, the object image being included in the acquired image; a thickness information acquiring unit that acquires thickness information corresponding to the distance acquired by the distance acquiring unit for each of the at least one object image; and a data generating unit that generates data in which the painterly image and the thickness information are associated with each other.

According to a second aspect of the present invention, there is provided a printer including: a data acquiring unit that acquires data in which a painterly image and thickness information are associated with each other; a first controller that performs control to apply a three-dimensional layer to a printing medium based on the thickness information acquired by the data acquiring unit; and a second controller that performs control to apply the painterly image acquired by the data acquiring unit, to the three-dimensional layer applied to the printing medium by the first controller.

According to a third aspect of the present invention, there is provided an image processing method including: acquiring an image; acquiring distance information based on a distance to an object for each of at least one object image included in the acquired image; transforming each of the at least one object image into a painterly image, the object image being included in the acquired image; acquiring thickness information corresponding to the acquired distance for each of the at least one object image; and generating data in which the painterly image and the thickness information are associated with each other.

According to the present invention, a three-dimensional painterly image, which faithfully represents a three-dimensional object viewed from a person who captures an image, can be acquired quickly and easily.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

[First Embodiment]

An embodiment of the present invention, where the invention is applied to a digital camera, is described below with reference to the attached drawings.

Figure 1:
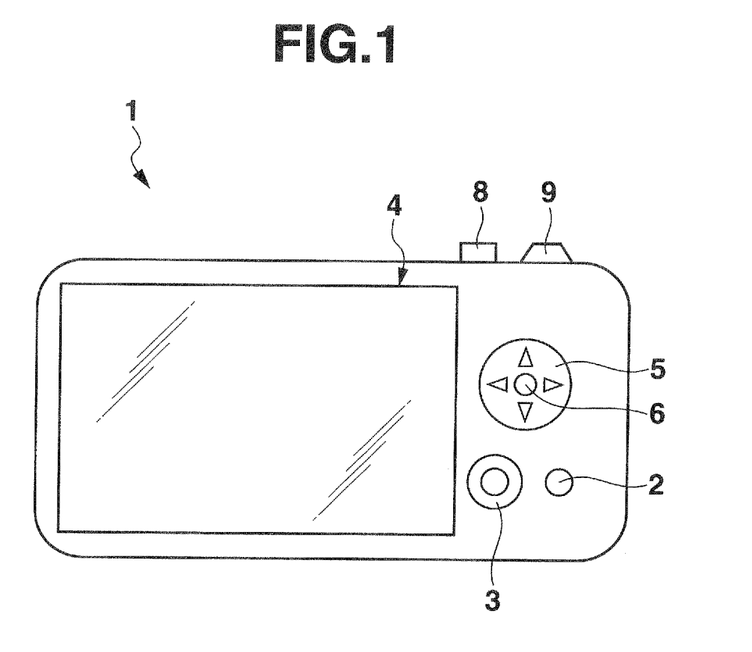
FIG. 1 is a rear view illustrating an external appearance of a digital camera according to an embodiment of the present invention.

FIG. 1 is a rear view illustrating an external appearance of a digital camera 1 according to the embodiment of the present invention. The digital camera 1 has a menu key 2, a mode dial 3, a liquid-crystal monitor 4, a cursor key 5, and a SET key 6 on its rear surface. The digital camera 1 also has a shutter key 8 and a power button 9 on its upper surface. Further, although not shown in FIG. 1, the digital camera 1 has an imaging lens 12, which will be described below, on its front surface; a printing unit 7A; a USB terminal connector; a wireless communication unit; and a card I/F unit. The USB terminal connector is used to connect to an external device, such as a personal computer (hereinafter referred to as PC) or a modem, through a USB cable. The wireless communication unit transmits and receives data wirelessly using Bluetooth, IrDA, or Wi-Fi, for example. The card I/F unit is a unit in which a memory card, such as an SD card, is set.

Figure 2:
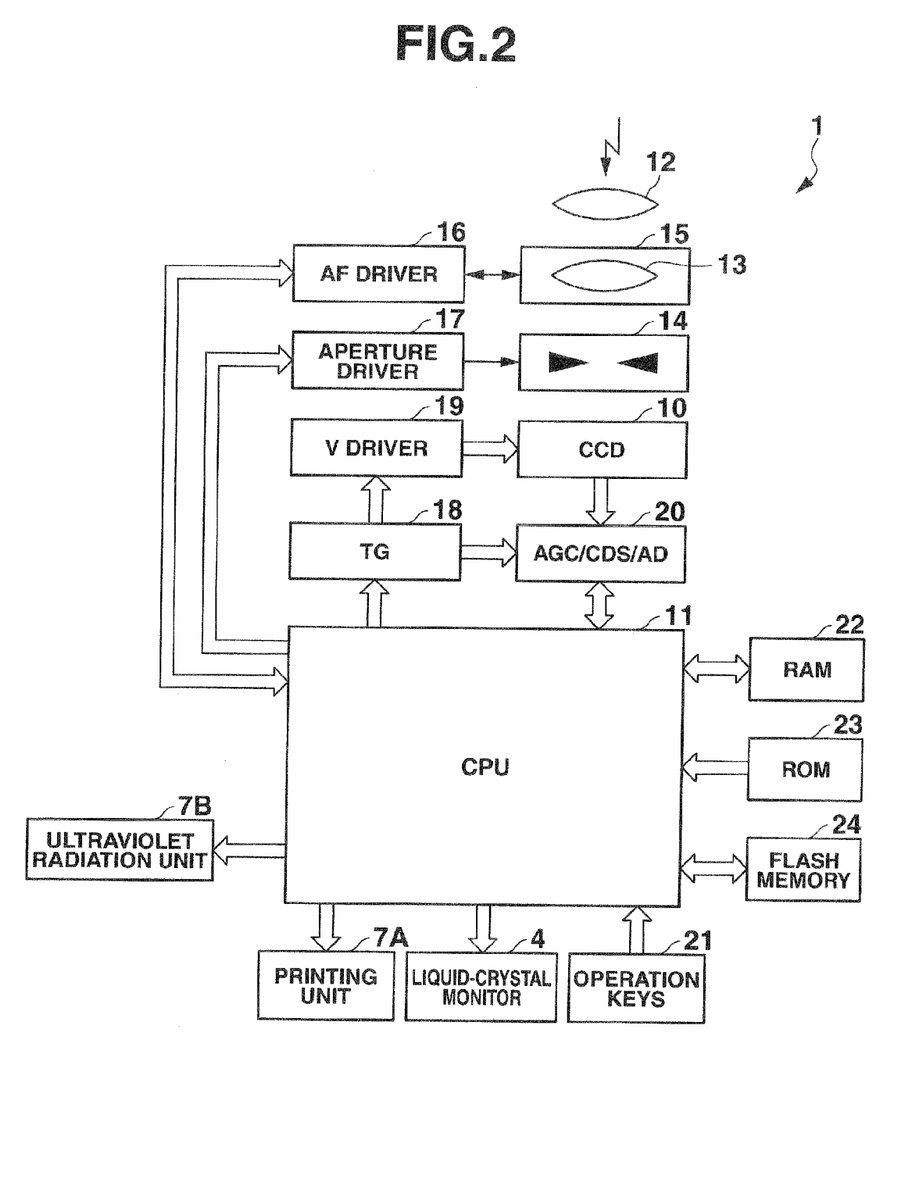
FIG. 2 is a block diagram schematically illustrating an electrical configuration of the digital camera.

FIG. 2 is a block diagram schematically illustrating the electrical configuration of the digital camera 1.

The digital camera 1 has a CCD 10 that serves as an imaging section. The digital camera 1 is mainly composed of a CPU 11 having an image processing function that compresses and expands an image captured by the CCD 10 and generates and reproduces an image file conforming to a predetermined format, for example, a unified standard DCF (Design rule for Camera File system) or JPEG (Joint Photographic Expert Group).

The digital camera 1 has a distance measuring section (not shown in the drawing) that measures a distance to each of a plurality of objects included in a captured image.

An optical image of an object is formed on a light-receiving surface of the CCD 10 through the imaging lens 12, a focus lens 13, and an aperture 14. The focus lens 13, which is held by a drive mechanism 15 including an AF motor, performs focusing operation by moving forward and backward on an optical axis in accordance with a drive signal supplied to the drive mechanism 15, the drive signal being output from an AF driver 16 in response to a control signal from the CPU 11. The aperture 14, which is driven by a drive signal generated by an aperture driver 17 based on a control signal from the CPU 11, adjusts the light quantity of an object image incident on the CCD 10.

The CPU 11 is connected with a timing generator (TG) 18 that generates a timing signal. A vertical driver (V driver) 19 drives the CCD 10 based on a timing signal generated by the TG 18. Then, the CCD 10 outputs and transmits an analog imaging signal associated with the brightness of an object image to a unit circuit 20.

The unit circuit 20 has a CDS, again adjustment amplifier (AGC), and an A/D converter (AD). The CDS holds an imaging signal output from the CCD 10. The imaging signal is supplied from the CDS to the gain adjustment amplifier, which is an analog amplifier. The analog imaging signal amplified and adjusted by the gain adjustment amplifier is converted into a digital signal by the A/D converter. The output signal from the CCD 10 undergoes black level adjustment and sampling and is transmitted to the CPU 11 as a digital signal. The gain adjustment amplifier (AGC) amplifies the imaging signal supplied from the CDS at a gain associated with the ISO sensitivity described below.

The CPU 11 is connected with operation keys 21 composed of a group of keys including the shutter key 8, the liquid-crystal monitor 4, a RAM 22, a ROM 23, and a flash memory 24.

The RAM 22 is a work memory while the flash memory 24 is an image recording memory. The digital signal (imaging signal) transmitted from the CCD 10 to the CPU 11 is temporarily stored in the RAM 22. The digital signal also undergoes a variety of image processing performed by the CPU 11 and is eventually stored in the flash memory 24 as compressed image data. The flash memory 24 may be a card type memory attachable/detachable to/from a camera main body.

The image data stored in the flash memory 24 is read out by the CPU 11 as required. The image data undergoes expansion and addition of a brightness signal and a color signal, and then is converted into a digital video signal or an analog video signal to be displayed on the liquid-crystal monitor 4. The liquid-crystal monitor 4 also displays an image periodically captured in a record mode as a live view image.

The ROM 23 is a program ROM that stores a variety of operation programs required for control of components and data processing in the CPU 11. Specifically, in addition to the programs, the ROM 23 stores a variety of data including a program diagram that indicates combinations of the ISO sensitivity and shutter speeds for appropriate exposure values at shooting.

In accordance with the program diagram, the CPU 11 performs AE control including the control of the charge accumulation time of the CCD 10 as a shutter speed, the aperture level of the aperture 14, and the gain of the gain adjustment amplifier (AGC) of the unit circuit 20. The CPU 11 also performs auto focus (AF) control, which drives the focus lens 13 based on a predetermined program, and auto white balance (AWB) control. The flash memory 24 stores the captured image data.

The ROM 23 stores a focus setting table. To measure an object distance, which is a distance to an object from the digital camera 1, using the distance measuring section, the focus of the focus lens 13 is controlled in a known contrast AF scheme. Based on the zoom ratio of the imaging lens 12 and the position of the focus lens 13, the object distance is measured with reference to the focus setting table stored in the ROM 23 in advance.

Figure 3:
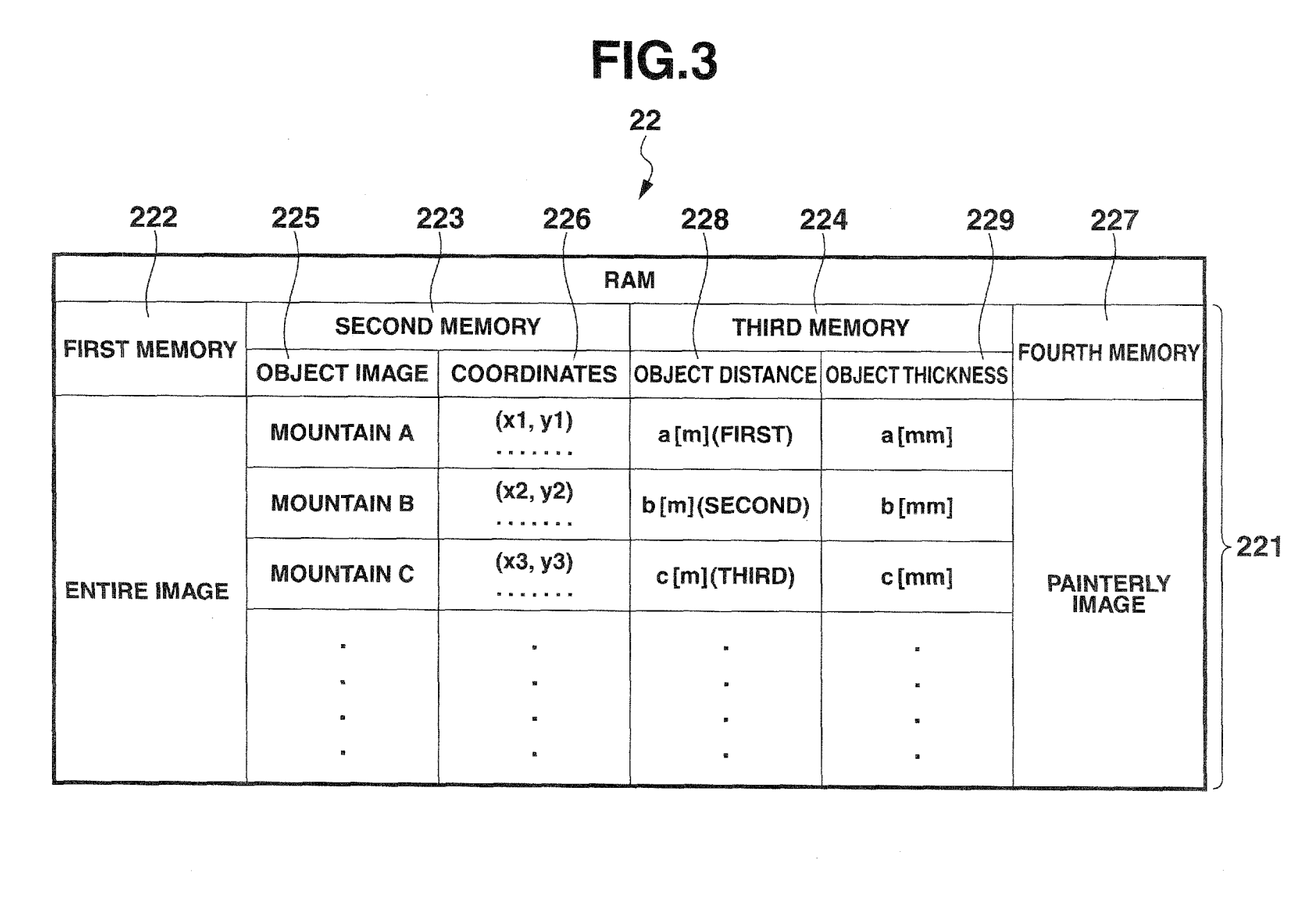
FIG. 3 illustrates a memory configuration of a RAM.

The RAM 22 includes a painterly transformation data area 221 as illustrated in FIG. 3. The painterly transformation data area 221 includes a first memory 222, a second memory 223, a third memory 224, and a fourth memory 227. The second memory 223 is divided into an object image memory 225 and a coordinate memory 226. The third memory 224 is divided into an object distance memory 228 and an object thickness memory 229.

The first memory 222 stores an image captured in a painterly image change mode (described below) as an entire image. The object image memory 225 of the second memory 223 stores an object image, which is an image of an object extracted from the entire image. The coordinate memory 226 stores position coordinates that indicate the position of the object image in the entire image. The object distance memory 228 of the third memory 224 stores the distance to the object from the digital cameral in a unit of meter (m) and stores the order of distance of a plurality of objects in order of proximity (short), such as the first, the second, and the like. The object thickness memory 229 of the third memory 224 stores information of object thickness corresponding to an object distance for each of the objects in a unit of millimeter (mm). The fourth memory 227 is used to generate a final painterly image.

The position coordinates that indicate the position of the object image in the entire image in the coordinate memory 226 may be any type of coordinates as long as they are a plurality of coordinates that identify the position of the object image in the entire image, such as coordinates of all dots in the entire area of the object image, coordinates of a contour alone, and other coordinates of a plurality of points.

The printing unit 7A performs a three-dimensional printing process and a painterly image printing process. The three-dimensional printing process applies a three-dimensional layer having a thickness corresponding to the measured distance to the object for each of the objects, onto a printing medium. The painterly image printing process prints a transformed painterly image on the three-dimensional layer, which has the thickness corresponding to the distance to each of a plurality of measured objects, after the three-dimensional printing process. The former three-dimensional printing process includes an ultraviolet curable layer printer (not shown in the drawing) that prints an ultraviolet curable material to form an ultraviolet curable layer. The latter painterly image printing process includes a known printer (not shown in the drawing) that prints an image, such as an inkjet printer or a thermal recording printer.

An ultraviolet radiation unit 7B radiates ultraviolet rays onto the ultraviolet curable layer printed with the printing unit 7A and cures the ultraviolet curable layer.

Figure 4:
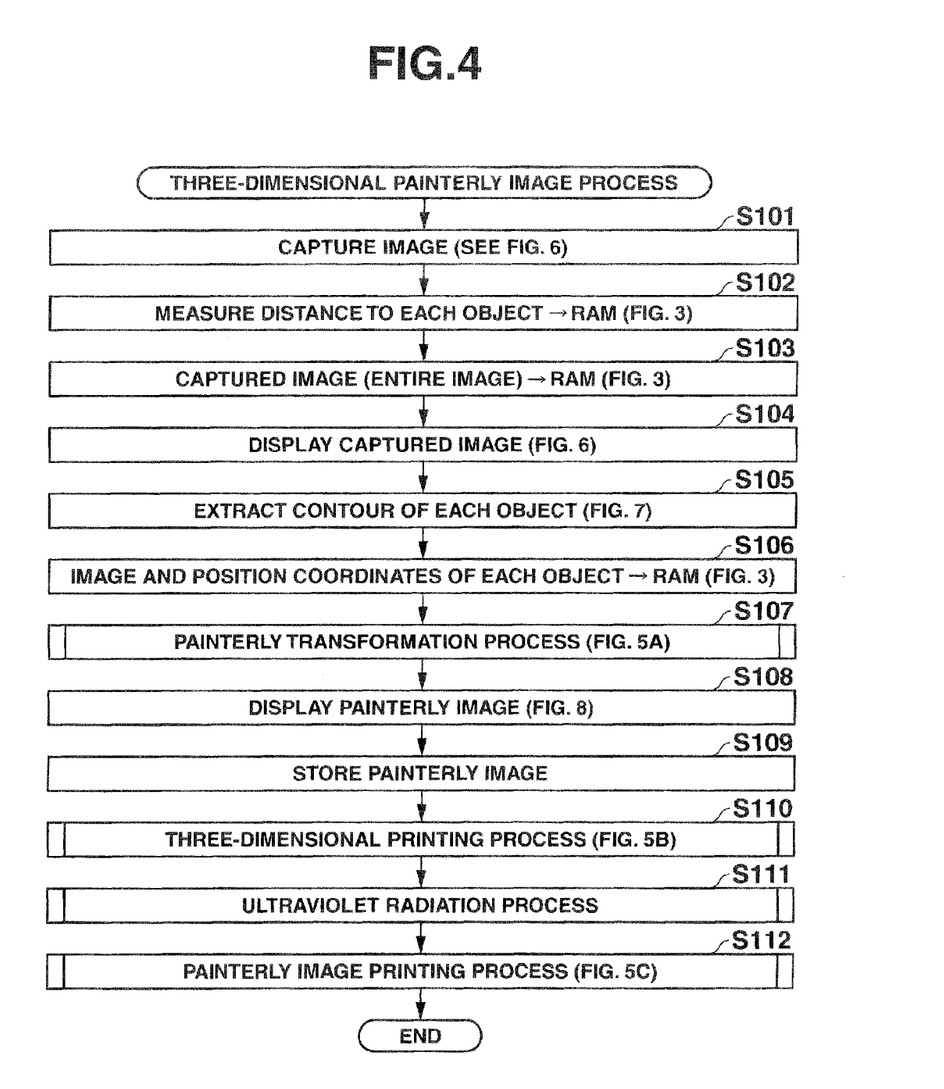
FIG. 4 is a flowchart illustrating a processing procedure in an embodiment of the present invention.

In the configuration according to the embodiment above, the digital camera 1 performs the three-dimensional printing process as shown in the flowchart in FIG. 4, as the CPU 11 executes processes based on the programs stored in the ROM 23.

Figure 6:
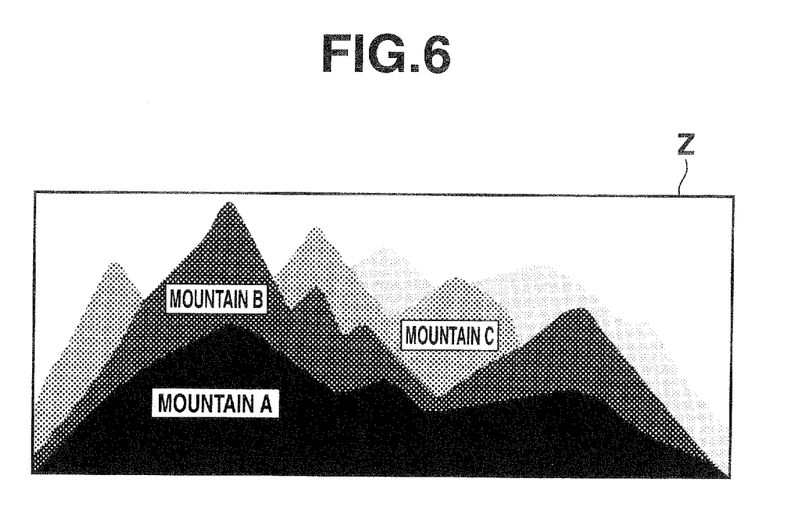
FIG. 6 illustrates an example of an entire captured image.

Specifically, a user carrying the digital camera 1 presses the shutter key 8 to capture a scene including objects "Mountain A," "Mountain B," and "Mountain C" as shown in FIG. 6, for example. The CPU 11 then starts an image capturing process (Step 101). The CPU 11 measures distances to the objects "Mountain A," "Mountain B," and "Mountain C" separately, and stores the distances in the object distance memory 228 of the third memory 224 in the painterly transformation data area 221 of the RAM 22 (Step S102).

In the measurement of the distances to respective objects, the focus of the focus lens 13 is controlled in the known contrast AF scheme as described above, and "Mountain A," "Mountain B," and "Mountain C" are sequentially focused. Based on the zoom ratio of the imaging lens 12 and the position of the focus lens 13, the object distance is obtained from the focus setting table stored in the ROM 23 in advance. In the process in Step S102, the measured distance "a" to the "Mountain A," the measured distance "b" to the "Mountain B," and the measured distance "c" to the "Mountain C" are stored in the object distance memory 228 of the third memory 224 in the painterly transformation data area 221 of the RAM 22 in a unit of meter (m), as shown in FIG. 3.

At this time, in addition to the measured distances, the order of the distance among the plurality of objects is also stored in the object distance memory 228 of the third memory 224. For example, the order of proximity (short), among the plurality of objects, such as the first, the second, and the like, as described above, is stored.

In the embodiment, the distances and the distance order are both stored. Alternatively, the distances or the distance order alone may be stored. In the case of storing the distance order alone, only a relative distance relationship among the objects should be detected, and thus it is unnecessary to detect accurate distances to objects, which allows the process to be performed at a low level of detection accuracy.

Subsequently, object thickness information corresponding to a distance to an object is acquired for each object based on the measured distance to each object, for a three-dimensional printing process described later. Specifically, a conversion table (not shown in the drawings) is prepared where the thickness information is stored in association with each range of object distance. More specifically, for example, the conversion table associates the thickness information of 30 millimeters with an object distance of 0-1000 meters, the thickness information of 20 millimeters with an object distance of 1000-2000 meters, the thickness information of 10 millimeters with an object distance of 2000-5000 meters, and the thickness information of 5 millimeters with an object distance of 5000 meters to infinity. Thus, the thickness information corresponding to the distance to each object is acquired.

When the measured distances for "Mountain A," "Mountain B," and "Mountain C" are 500 meters, 1500 meters, and 4000 meters, respectively, the thickness information of 30 millimeters is stored for "Mountain A," 20 millimeters for "Mountain B," and 10 millimeters for "Mountain C," in a unit of millimeter (mm), in the object thickness memory 229 of the third memory 224 in the painterly transformation data area 221 in the RAM 22.

The correspondence relations between the object distances and the object thicknesses in the conversion table described above are merely an example, and are not limited thereto.

Thereafter, the CPU 11 imports the object images formed on the CCD 10 as an entire image and stores the image in the first memory 222 in the painterly transformation data area 221 of the RAM 22 (Step S103). Thus, the first memory 222 of the painterly transformation data area 221 stores the image including "Mountain A," "Mountain B," and "Mountain C," as an entire image Z, shown in FIG. 6.

Subsequently, the CPU 11 executes a captured image displaying process to display the captured image on the liquid-crystal monitor 4 (Step S104). Thus, the liquid-crystal monitor 4 displays the entire image Z as shown in FIG. 6.

Figure 7:
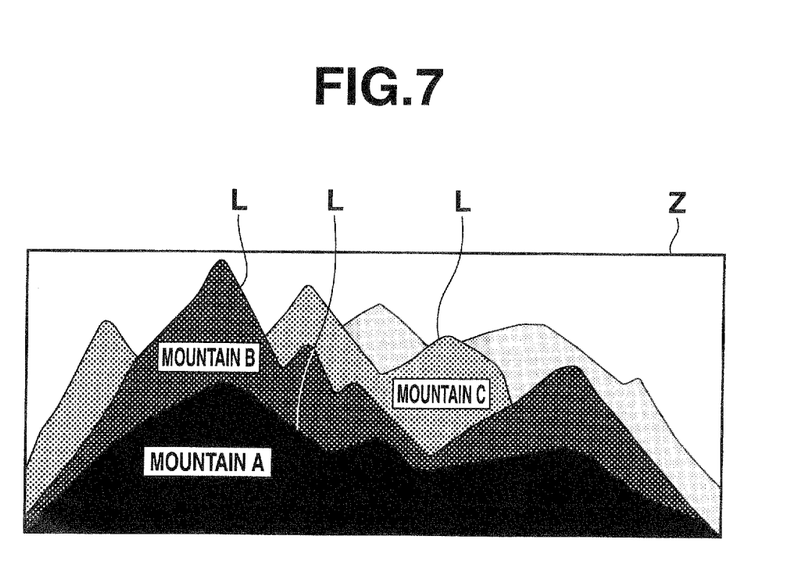
FIG. 7 illustrates contours L of a captured image and portions enclosed thereby.

Then, the CPU 11 extracts a contour of each object in the entire image Z (Step S105). To extract the contour of each object, as shown in FIG. 7, the area is divided according to color phases based on a brightness signal and a color-difference signal of image data of the entire image Z. Furthermore, a contour L that represents a boundary of areas is extracted and a portion enclosed by the contour L is detected as one extracted area.

An image of each extracted object is stored as an object image in the object image memory 225 of the second memory 223 in the painterly transformation data area 221. Position coordinates of each object image in the entire image Z are also stored in the coordinate memory 226 of the second memory 223 (Step S106). Accordingly, as shown in FIG. 3, the object image memory 225 of the second memory 223 in the painterly transformation data area 221 stores the object images of "Mountain A," "Mountain B," and "Mountain C," and the coordinate memory 226 stores the position coordinates (x1, y1) . . . of "Mountain A," the position coordinates (x2, y2) . . . of "Mountain B," and the position coordinates (x3, y3) . . . of "Mountain C."

Subsequently, the CPU 11 executes a painterly transformation process (Step S107).

Figure 5A:
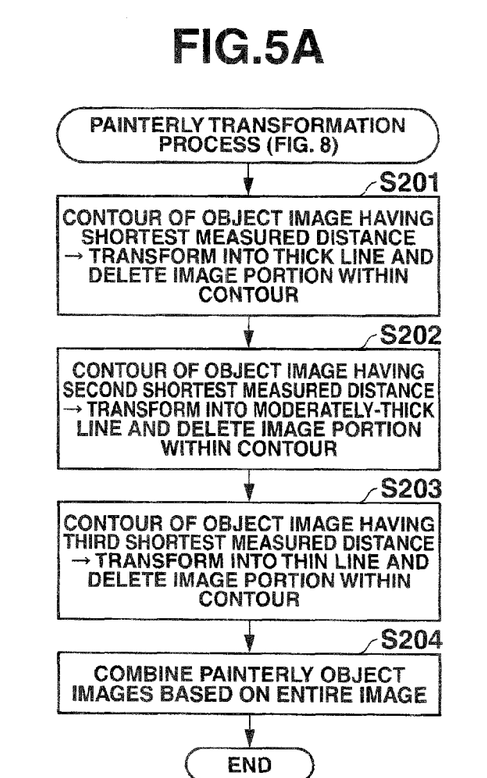
FIGS. 5A to 5C are each a flowchart illustrating a painterly transformation process, a three-dimensional printing process, and a painterly image printing process, respectively.

FIG. 5A is a flowchart illustrating the procedure for the painterly transformation process (Step S107).

Figure 8:
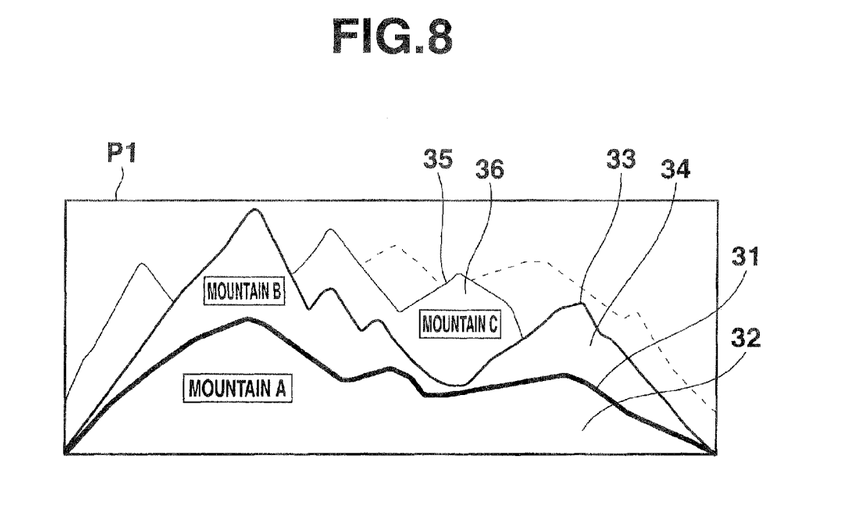
FIG. 8 illustrates an example of a transformed painterly image.

The contour of the image of an object having the shortest measured distance is transformed into a thick line and the image portion within the contour transformed into the thick line is deleted (Step S201). Thus, as shown in FIG. 8, a painterly object image 32 of "Mountain A" composed only of the contour drawn by the thick line 31 is generated.

Subsequently, the contour of the image of an object having the second shortest measured distance is transformed into a moderately-thick line (line thinner than for the shortest object image and thicker than for the third shortest object image) and the image portion within the contour transformed into the moderately-thick line is deleted (Step S202). Thus, as shown in FIG. 8, a painterly object image 34 of "Mountain B" composed only of the contour drawn by the moderately-thick line 33 is generated.

Furthermore, the contour of the image of an object having the third shortest measured distance is transformed into a thin line (line thinner than for the second shortest object image and thicker than for the fourth shortest object image) and the image portion within the contour transformed into the thin line is deleted (Step S203). Thus, as shown in FIG. 8, a painterly object image 36 of "Mountain C" composed only of the contour drawn by the thin line 35 is generated.

In a similar manner, a contour is transformed into a thinner line as the measured distance for an object image is longer, and the image portion within the transformed contour is deleted.

After all object images are transformed into painterly object images each composed only of a contour, the painterly object images 32, 34, 36 . . . are combined (Step S204).

Specifically, as shown in FIG. 3, the coordinate memory 226 of the second memory 223 in the painterly transformation data area 221 stores the position coordinates (x1, y1) . . . of "Mountain A," the position coordinates (x2, y2) . . . of "Mountain B," and the position coordinates (x3, y3) . . . of "Mountain C." Thus, in the fourth memory 227, the CPU 11 positions the painterly object image 32 of "Mountain A" on a location indicated by the position coordinates (x1, y1) . . . of "Mountain A," positions the painterly object image 34 of "Mountain B" on a location indicated by the position coordinates (x2, y2) . . . of "Mountain B," and positions the painterly object image 36 of "Mountain C" on a location indicated by the position coordinates (x3, y3) . . . of "Mountain C," and then combines the object images.

Accordingly, a painterly image P1 is generated in the fourth memory 227 in the painterly transformation data area 221, as shown in FIG. 8, the painterly image P1 including the painterly object image 32 of "Mountain A," the painterly object image 34 of "Mountain B," and the painterly object image 36 of "Mountain C" on the locations corresponding to "Mountain A," "Mountain B," and "Mountain C" in the entire image Z shown in FIG. 6.

In the flowchart of FIG. 4, a painterly image displaying process is executed in Step S108 subsequent to Step S107 to display the generated painterly image on the liquid-crystal monitor 4. Thus, the liquid-crystal monitor 4 displays the painterly image P1 shown in FIG. 8.

The displayed painterly image P1 is like an ink brush painting which are drawn only by the lines 31, 33, and 35 having different thicknesses depending on the distance to each object. According to the embodiment, it is possible to generate the painterly image by automatically and easily transforming a captured image into a drawing composed of lines having various thicknesses depending on the distance between an object and the person who captures the image. In other words, artistic image transformation into an image like an ink brush painting can be automatically and easily performed. In addition, according to the embodiment, the painterly image is displayed on the liquid-crystal monitor 4. This allows the user to quickly and easily view the painterly image showing a stronger sense of perspective.

Thereafter, the displayed painterly image is stored in the flash memory 24 (Step S109). Thus, the painterly image, which has undergone the ink-brush artistic process, can be read out later from the flash memory 24 to be displayed on the liquid-crystal monitor 4 for viewing.

Subsequently, the CPU 11 executes a three-dimensional printing process (Step S110).

Figure 5B:
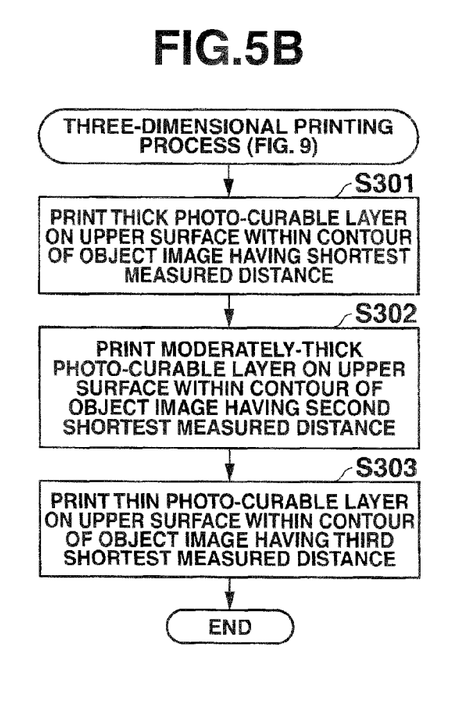

FIG. 5B is a flowchart illustrating the procedure for the three-dimensional printing process (Step S110).

Figures 9A, 9B:
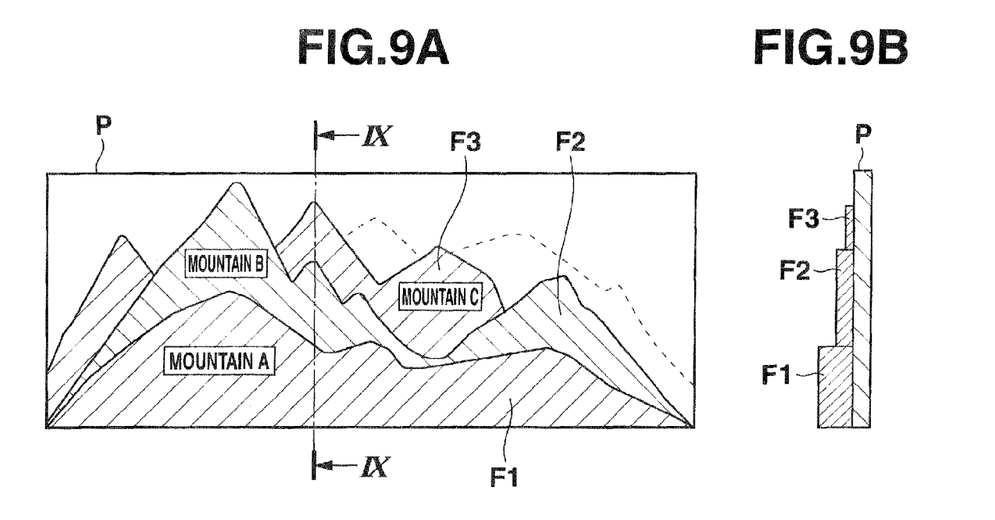
FIG. 9A is a plan view illustrating a state after the three-dimensional printing process.
FIG. 9B is a cross-sectional view along line IX-IX in FIG. 9A.

A thick photo-curable layer F1 (the thickness of which is 30 millimeters in the embodiment) is applied, with the printing unit 7A, to a printing board P within the contour of the object image having the shortest measured distance (Step S301). Thus, as shown in FIGS. 9A and 9B, the 30-millimeter-thick photo-curable layer F1 is applied to the entire painterly object image 32 of "Mountain A" composed only of the contour drawn by the thick line 31 on the printing board P. The printing board P is a commercially available canvas to be used for painting, a fabric, regular paper, a plastic plate, a metal plate, or a wood block.

Then, a relatively thick photo-curable layer F2 (thinner than the layer for the shortest-distance object and thicker than the layer for the third-shortest-distance object; the thickness of which is 20 millimeters in the embodiment) is applied, with the printing unit 7A, to the printing board P within the contour of the object image having the second shortest measured distance (Step S302). Thus, as shown in FIGS. 9A and 9B, the 20-millimeter-thick photo-curable layer F2 is applied to the entire painterly object image 34 of "Mountain B" composed only of the contour drawn by the moderately-thick line 33 on the printing board P.

Furthermore, a thin photo-curable layer F3 (thinner than the layer for the second-shortest-distance object and thicker than the layer for the fourth-shortest-distance object; the thickness of which is 10 millimeters in the embodiment) is applied, with the printing unit 7A, to the printing board P within the contour of the object image having the third shortest measured distance (Step S303). Thus, as shown in FIGS. 9A and 9B, the 10-millimeter-thick photo-curable layer F3 is applied to the entire painterly object image 36 of "Mountain C" composed only of the contour drawn by the thin line 35 on the printing board P.

In a similar manner, the photo-curable layer Fn is applied to the entire area within a contour such that the layer is thinner as the measured distance for an object image is longer, in the printing process.

Subsequently, the CPU 11 executes an ultraviolet radiation process for all the photo-curable layers F1 to F3 (Step S111). In the ultraviolet radiation process, the ultraviolet radiation unit 7B is driven and controlled to radiate ultraviolet rays onto the entire surfaces of the ultraviolet curable layers printed with the printing unit 7A to cure the ultraviolet curable layers.

Subsequently, the CPU 11 executes a painterly image printing process (Step S112).

Figure 5C:
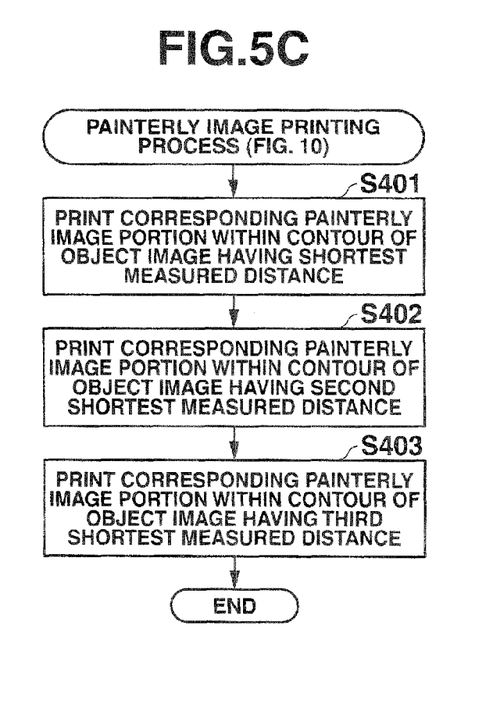

FIG. 5C is a flowchart illustrating the procedure for the painterly image printing process (Step S112).

Figure 10A:
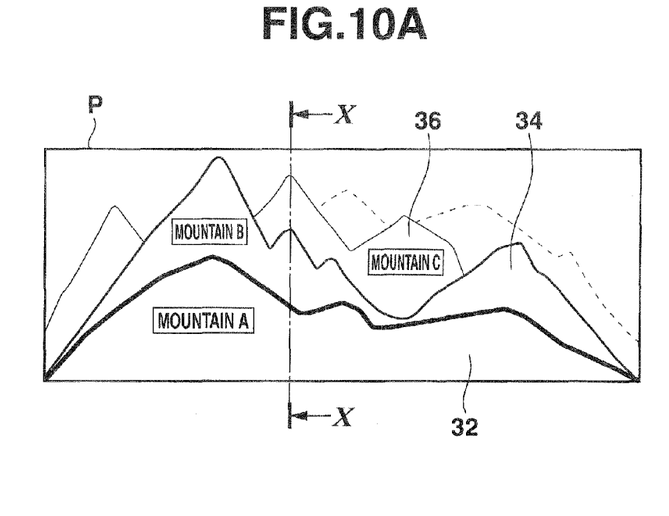
FIG. 10A is a plan view illustrating a state after the painterly image printing process.
Figure 10B:
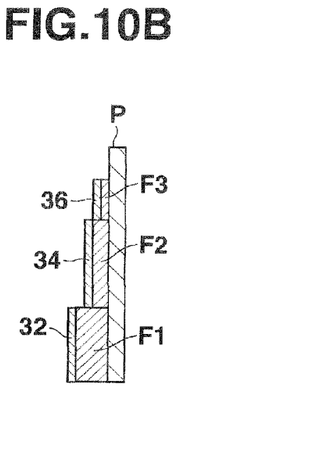
FIG. 10B is a cross-sectional view along line X-X in FIG. 10A.

A portion of the painterly object image, which has undergone the painterly transformation process, is applied with the printing unit 7A to the photo-curable layer F1, which is a three-dimensional layer thickly (30 millimeters thick) applied to the entire portion within the contour of the object image corresponding to the shortest measured distance. Specifically, in the fourth memory 227, the CPU 11 applies the painterly object image 32 of "Mountain A" to the corresponding location indicated by the position coordinates (x1, y1) . . . of "Mountain A," using the printing unit 7A (Step S401). Thus, as shown in FIGS. 10A and 10B, the entirety of the painterly object image 32 of "Mountain A" is further printed on the photo-curable layer F1, which has already been printed thickly (30 millimeters thick) on the printing board P.

Then, a portion of the painterly object image, which has undergone the painterly transformation process, is applied with the printing unit 7A to the photo-curable layer F2, which is a three-dimensional layer relatively thickly (20 millimeters thick) applied to the entire portion within the contour of the object image corresponding to the second shortest measured distance. Specifically, the CPU 11 applies the painterly object image 34 of "Mountain B" to the corresponding location indicated by the position coordinates (x2, y2) . . . of "Mountain B," using the printing unit 7A (Step S402). Thus, as shown in FIGS. 10A and 10B, the entirety of the painterly object image 34 of "Mountain B" is further printed on the photo-curable layer F2, which has already been printed relatively thickly (20 millimeters thick) on the printing board P.

Furthermore, a portion of the painterly object image, which has undergone the painterly transformation process, is applied with the printing unit 7A to the photo-curable layer F3, which is a three-dimensional layer thinly (10 millimeters thick) applied to the entire portion within the contour of the object image corresponding to the third shortest measured distance. Specifically, the CPU 11 applies the painterly object image 36 of "Mountain C" to the corresponding location indicated by the position coordinates (x3, y3) . . . of "Mountain C," using the printing unit 7A (Step S403). Thus, as shown in FIGS. 10A and 10B, the entirety of the painterly object image 36 of "Mountain C" is further printed on the photo-curable layer F3, which has already been printed thinly (10 millimeters thick) on the printing board P.

In a similar manner, each painterly image for an object is printed, with the printing unit 7A, on the corresponding layer among the photo-curable layers F1 to Fn, which are applied such that a photo-curable layer becomes thinner as the measured distance for the corresponding object image becomes longer.

The printed painterly image P1 is an image like an ink brush painting of the object images drawn on the photo-curable layers F1 to Fn, which are the three-dimensional layers having different thicknesses depending on the distances to the object images. According to the embodiment, a painterly image can be viewed quickly and easily, while the painterly image shows a stronger sense of perspective according to the distance between an object and a person who captures the image.

[Modification of First Embodiment]

Figure 11A:
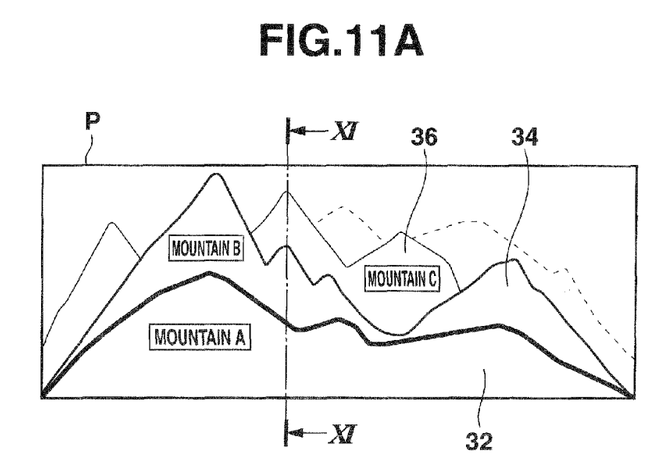
FIG. 11A is a plan view illustrating a state after the painterly image printing process according to a modification.
Figure 11B:
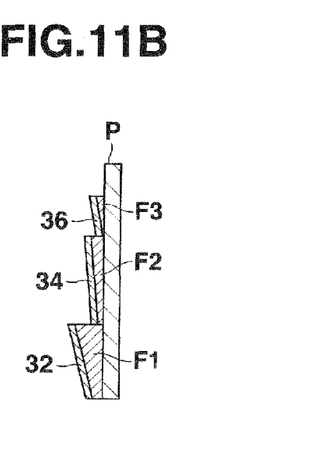
FIG. 11B is a cross-sectional view along line XI-XI in FIG. 11A.

FIG. 11 is a modification of the first embodiment. In the modification, as shown in FIGS. 11A and 11B, the photo-curable layers F1 to F3 are printed within the respective contours so as to be thick in the upper portion and be thinner toward the lower portion in Steps S301 to S303 of FIG. 5B. The corresponding painterly object images 32, 34, and 36 are printed, with the printing unit 7A, on the upper surfaces of the photo-curable layers F1 to F3 printed as described above. This can provide three-dimensional painterly images having more emphasized contours.

In the present embodiments, the respective contours of the plurality of object images included in the image captured by the imaging unit are extracted. The three-dimensional layers, each of which has the thickness corresponding to the measured distance to each of the objects, are applied to the printing board for the respective extracted contours. Then, the plurality of painterly object images, which have undergone the painterly transformation process, are applied to the three-dimensional layers on the printing board. Alternatively, a plurality of object images included in a captured image may be transformed into painterly images in a painterly transformation process. The respective contours of the plurality of transformed painterly images may be extracted. Three-dimensional layers each having a thickness corresponding to the measured distance to each of the plurality of objects may be applied to a printing board for the respective extracted contours. Then, the plurality of painterly object images, which have undergone a painterly transformation process, may be applied to the three-dimensional layers on the printing board.

A case is presented in which the present invention is applied to a digital camera. Instead of the digital camera, the present invention may be applied to any device, such as a cellular phone, as long as it has an imaging unit.

[Second Embodiment]

In the first embodiment, a case where the present invention is applied to a digital camera is described. In the second embodiment, a case where the present invention is applied to a system composed of a digital camera, an image processing apparatus such as a PC, and a printer is described.

A user carrying the digital camera 1 presses the shutter key 8 to capture a scene including objects "Mountain A," "Mountain B," and "Mountain C" as shown in FIG. 6, for example. The CPU 11 then starts an image capturing process. The CPU 11 measures distances to the objects "Mountain A," "Mountain B," and "Mountain C" separately, and stores the distances in the object distance memory 228 of the third memory 224 in the painterly transformation data area 221 of the RAM 22.

Thereafter, the CPU 11 imports the object images formed on the CCD 10 as an entire image and stores the image in the first memory 222 in the painterly transformation data area 221 of the RAM 22. Thus, the first memory 222 of the painterly transformation data area 221 stores the image including "Mountain A," "Mountain B," and "Mountain C," as an entire image Z, shown in FIG. 6.

Then, the data in the painterly transformation data area 221 is stored in a storage medium such as an SD card.

Next, the operation of the image processing apparatus such as a PC will be described, although the operation is not shown in the drawings.

The image processing apparatus, such as a PC, reads the data in the painterly transformation data area 221 stored in the storage medium such as an SD card.

After reading the data, the image processing apparatus extracts a contour of each object in the entire image Z. To extract the contour of each object, as shown in FIG. 7, the area is divided according to color phases based on a brightness signal and a color-difference signal of image data of the entire image Z. Furthermore, a contour L that represents a boundary of areas is extracted and a portion enclosed by the contour L is detected as one extracted area.

An image of each extracted object is stored as an object image in the object image memory 225 of the second memory 223 in the painterly transformation data area 221. Position coordinates of each object image in the entire image Z are also stored in the coordinate memory 226 of the second memory 223. Accordingly, as shown in FIG. 3, the object image memory 225 of the second memory 223 in the painterly transformation data area 221 stores the object images of "Mountain A," "Mountain B," and "Mountain C," and the coordinate memory 226 stores the position coordinates (x1, y1) . . . of "Mountain A," the position coordinates (x2, y2) . . . of "Mountain B," and the position coordinates (x3, y3) . . . of "Mountain C."

Subsequently, the image processing apparatus executes a painterly transformation process.

The contour of the image of an object having the shortest measured distance is transformed into a thick line and the image portion within the contour transformed into the thick line is deleted. Thus, as shown in FIG. 8, a painterly object image 32 of "Mountain A" composed only of the contour drawn by the thick line 31 is generated.

Subsequently, the contour of the image of an object having the second shortest measured distance is transformed into a moderately-thick line (line thinner than for the shortest object image and thicker than for the third shortest object image) and the image portion within the contour transformed into the moderately-thick line is deleted. Thus, as shown in FIG. 8, a painterly object image 34 of "Mountain B" composed only of the contour drawn by the moderately-thick line 33 is generated.

Furthermore, the contour of the image of an object having the third shortest measured distance is transformed into a thin line (line thinner than for the second shortest object image and thicker than for the fourth shortest object image) and the image portion within the contour transformed into the thin line is deleted. Thus, as shown in FIG. 8, a painterly object image 36 of "Mountain C" composed only of the contour drawn by the thin line 35 is generated.

In a similar manner, a contour is transformed into a thinner line as the measured distance for an object image is longer, and the image portion within the transformed contour is deleted.

After all object images are transformed into painterly object images each composed only of a contour, the painterly object images 32, 34, 36 . . . are combined.

Specifically, as shown in FIG. 3, the coordinate memory 226 of the second memory 223 in the painterly transformation data area 221 stores the position coordinates (x1, y1) . . . of "Mountain A," the position coordinates (x2, y2) . . . of "Mountain B," and the position coordinates (x3, y3) . . . of "Mountain C." Thus, in the fourth memory 227, the image processing apparatus positions the painterly object image 32 of "Mountain A" on a location indicated by the position coordinates (x1, y1) . . . of "Mountain A," positions the painterly object image 34 of "Mountain B" on a location indicated by the position coordinates (x2, y2) . . . of "Mountain B," and positions the painterly object image 36 of "Mountain C" on a location indicated by the position coordinates (x3, y3) . . . of "Mountain C," and then combines the object images.

Accordingly, a painterly image P1 is generated in the fourth memory 227 in the painterly transformation data area 221, as shown in FIG. 8, the painterly image P1 including the painterly object image 32 of "Mountain A," the painterly object image 34 of "Mountain B," and the painterly object image 36 of "Mountain C" on the locations corresponding to "Mountain A," "Mountain B," and "Mountain C" in the entire image Z shown in FIG. 6.

Subsequently, object thickness information corresponding to a distance to an object is acquired for each object based on the measured distance to each object, for a three-dimensional printing process described later. Specifically, a conversion table (not shown in the drawings) is prepared where the thickness information is stored in association with each range of object distance. More specifically, for example, the conversion table associates the thickness information of 30 millimeters with an object distance of 0-1000 meters, the thickness information of 20 millimeters with an object distance of 1000-2000 meters, the thickness information of 10 millimeters with an object distance of 2000-5000 meters, and the thickness information of 5 millimeters with an object distance of 5000 meters to infinity. Thus, the thickness information corresponding to the distance to each object is acquired.

When the measured distances for "Mountain A," "Mountain B," and "Mountain C" are 500 meters, 1500 meters, and 4000 meters, respectively, the thickness information of 30 millimeters is stored for "Mountain A," 20 millimeters for "Mountain B," and 10 millimeters for "Mountain C," in a unit of millimeter (mm), in the object thickness memory 229 of the third memory 224 in the painterly transformation data area 221.

Thereafter, the data in the painterly transformation data area 221 is stored in a storage medium such as an SD card. Accordingly, this data can be used in a printer that prints a three-dimensional image.

Figure 12:
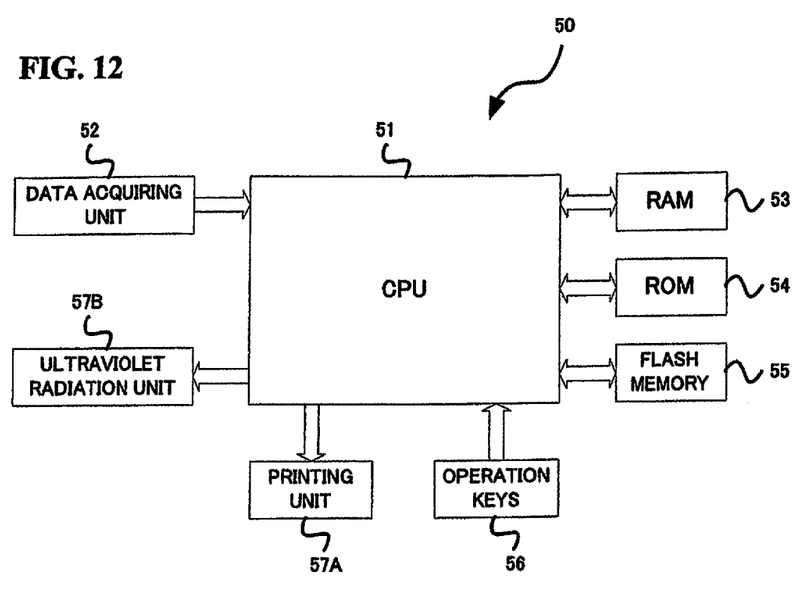
FIG. 12 is a block diagram schematically illustrating an electrical configuration of a printer according to an embodiment of the present invention.

Next, the operation of the printer 50 that prints the three-dimensional image will be described with reference to FIG. 12.

The printer 50, using a data acquiring unit 52, acquires data, in which a painterly image and thickness information are associated with each other, from the image processing apparatus such as a PC, through the storage medium such as an SD card.

After acquiring the data in which the painterly image and the thickness information are associated with each other, the printer performs the three-dimensional printing process under control of a CPU 51 serving as a first controller and a second controller.

The three-dimensional printing process is performed in a manner similar to that in the first embodiment. Accordingly, the detailed explanation for the process is omitted here.

The apparatus that uses the data, in which the painterly image and the thickness information are associated with each other, is not limited to the printer, but may be another apparatus that generates substance having a three-dimensional shape.

In the second embodiment, the digital camera has a role in image capturing and acquisition of distance information for each object; and the image processing apparatus such as a PC has a role in separation of each object image, execution of the painterly transformation process, combination of the object images after undergoing the painterly transformation process, and acquisition of object thickness information corresponding to a distance of each object. However, the division of roles between the digital camera and the image processing apparatus is not limited thereto.

Alternatively, the digital camera may perform the processes from the image shooting to the acquisition of the object thickness information corresponding to the distance of each object. Then, the data in which the painterly image and the thickness information are associated with each other may be stored in the storage medium such as an SD card and the data maybe used by the printer that prints three-dimensional images.

In the second embodiment, data is transmitted/received through the storage medium such as an SD card, between the digital camera and the image processing apparatus such as a PC, and between the image processing apparatus and the printer. Alternatively, the data may be transmitted/received through communication with a USB or wireless communication with Bluetooth or the like.

[Modification of Second Embodiment]

In the second embodiment, the image processing apparatus such as a PC separates each object image, executes the painterly transformation process, combines the object images after undergoing the painterly transformation process, and acquires object thickness information corresponding to the distance of each object, after the image processing apparatus acquires the data in which an object and the distance information of the object are associated with each other.

In this modification, the acquired image data is ordinary image data, which does not include the distance information for each object.

In this case, contours in the acquired image are extracted, the image area is divided into areas of respective objects enclosed by each of the extracted contours, and the distance information is added for each of the objects into which the area is divided. The process for adding the distance information is explained in detail in Japanese Unexamined Patent Application Publication No. 2010-154422. Accordingly, the explanation for its detailed principle of operation is omitted here.

After the image area is divided into the areas of the respective objects included in the image, and the distance information is added for each of the objects, predetermined data is stored in the painterly transformation data area 221, in a manner similar to the process explained in the first embodiment.

Thereafter, the data in the painterly transformation data area 221 is stored in a storage medium such as an SD card. Accordingly, this data can be used in a printer that prints a three-dimensional image.

The entire disclosure of Japanese Patent Application No. 2011-157597 filed on Jul. 19, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus comprising:
   an image acquiring unit that acquires an image;
   a distance acquiring unit that acquires a distance to an object for an object image included in the image acquired by the image acquiring unit;
   a contour extracting unit that extracts a contour of the object image included in the image acquired by the image acquiring unit;
   a painterly transformation processor that transforms the object image included in the acquired image into a painterly image, wherein the painterly transformation processor comprises a line transformation processor that transforms the extracted contour of the object image into a line having a style corresponding to the acquired distance;
   a thickness information acquiring unit that acquires thickness information corresponding to the distance acquired by the distance acquiring unit for the corresponding line having the style corresponding to the acquired distance; and
   a data generating unit that generates data in which the line and the thickness information are associated with each other.

2. The image processing apparatus according to claim 1, wherein the line transformation processor comprises a line variation transformation processor that transforms the extracted contour of the object image into a thinner line as the distance to the object is longer, and into a thicker line as the distance to the object is shorter,
   wherein the thickness information acquiring unit adds information indicating a smaller thickness for a thinner line, and adds information indicating a larger thickness for a thicker line.

3. The image processing apparatus according to claim 1, wherein the image acquiring unit comprises a communication section that receives an input of image data from an external device including a communication section.

4. The image processing apparatus according to claim 1, wherein the image acquiring unit comprises a wireless communication section that wirelessly receives an input of image data from an external device including a wireless transmission section.

5. The image processing apparatus according to claim 1, wherein the image acquiring unit comprises an image input section that receives an input of image data stored in a storage medium.

6. The image processing apparatus according to claim 1,
   wherein the image acquiring unit comprises an imaging section to capture the image, and acquires the image including the object image captured by the imaging section;
   the distance acquiring unit comprises a distance measuring section that measures the distance to the object for the object image included in the image captured by the imaging section, and acquires the distance using the distance measuring section;
   the painterly transformation processor transforms the object image included in the captured image into the painterly image;
   the thickness information acquiring unit acquires the thickness information corresponding to the distance measured by the distance measuring section for the corresponding line having the style corresponding to the acquired distance; and
   the data generating unit generates the data in which the line and the thickness information are associated with each other.

7. The image processing apparatus according to claim 1, further comprising:
   a first controller that performs control to apply a three-dimensional layer to a printing medium, the three-dimensional layer having a thickness corresponding to the acquired distance for the corresponding line having the style corresponding to the acquired distance; and
   a second controller that performs control to apply the painterly image to the three-dimensional layer applied to the printing medium by the first controller.

8. The image processing apparatus according to claim 7, wherein the first controller comprises a thickness controller that performs control so that the three-dimensional layer is applied to the printing medium thickly in an upper portion of the three-dimensional layer and more thinly as a position in the three-dimensional layer becomes lower.

9. A printer comprising:
   a data acquiring unit that acquires data in which a painterly image and thickness information are associated with each other;
   a first controller that performs control to apply a three-dimensional layer to a printing medium based on the thickness information acquired by the data acquiring unit; and
   a second controller that performs control to apply the painterly image acquired by the data acquiring unit, to the three-dimensional layer applied to the printing medium by the first controller;
   wherein:
   the painterly image includes an object image;
   a contour of the object image included in the painterly image is transformed into a line having a style corresponding to a distance for the object image; and
   the thickness information corresponding to the distance for the object image is added for the corresponding line having the style corresponding to the distance.

10. The printer according to claim 9, wherein the first controller comprises a thickness controller that performs control so that the three-dimensional layer is applied to the printing medium thickly in an upper portion of the three-dimensional layer and more thinly as a position in the three-dimensional layer becomes lower.

11. An image processing method using an image processing apparatus which comprises a CPU, the method comprising:
- acquiring an image with the CPU;
- acquiring, with the CPU, a distance to an object for an object image included in the acquired image;
- extracting, with the CPU, a contour of the object image;
- transforming, with the CPU, the object image included in the acquired image into a painterly image, wherein transforming the object image into the painterly image comprises transforming the extracted contour of the object image into a line having a style corresponding to the acquired distance;
- acquiring, with the CPU, thickness information corresponding to the acquired distance for the corresponding line having the style corresponding to the acquired distance; and
- generating, with the CPU, data in which the line and the thickness information are associated with each other.

* * * * *